(12) United States Patent
Shelton

(10) Patent No.: US 7,354,223 B2
(45) Date of Patent: Apr. 8, 2008

(54) MECHANICAL SHIP LIFT

(76) Inventor: Bert G. Shelton, 5510 Effingham, Houston, TX (US) 77035

( * ) Notice: Subject to any disclaimer, the term of this patent is extended or adjusted under 35 U.S.C. 154(b) by 487 days.

(21) Appl. No.: 11/188,387

(22) Filed: Jul. 25, 2005

(65) Prior Publication Data

US 2007/0020050 A1    Jan. 25, 2007

(51) Int. Cl.
*E02C 1/00* (2006.01)
(52) U.S. Cl. .................................. 405/86; 405/2; 405/3
(58) Field of Classification Search ............... 405/2, 405/3, 86, 85
See application file for complete search history.

(56) References Cited

U.S. PATENT DOCUMENTS 710,635 A * 10/1902 Umlauf ..................... 405/86

FOREIGN PATENT DOCUMENTS

DE        3233865 A1 *  9/1983

OTHER PUBLICATIONS

The Falkirk Wheel; www.thefalkirkwheel.co.uk.

* cited by examiner

*Primary Examiner*—John Kreck
(74) *Attorney, Agent, or Firm*—Woodard Emhardt Moriarty McNett & Henry LLP

(57) ABSTRACT

A system for lifting ships from one waterway to another waterway. A convex basin is constructed between the waterways and slidably receives a pair of inter-connected chambers movable transverse to the direction of the waterway.

24 Claims, 11 Drawing Sheets

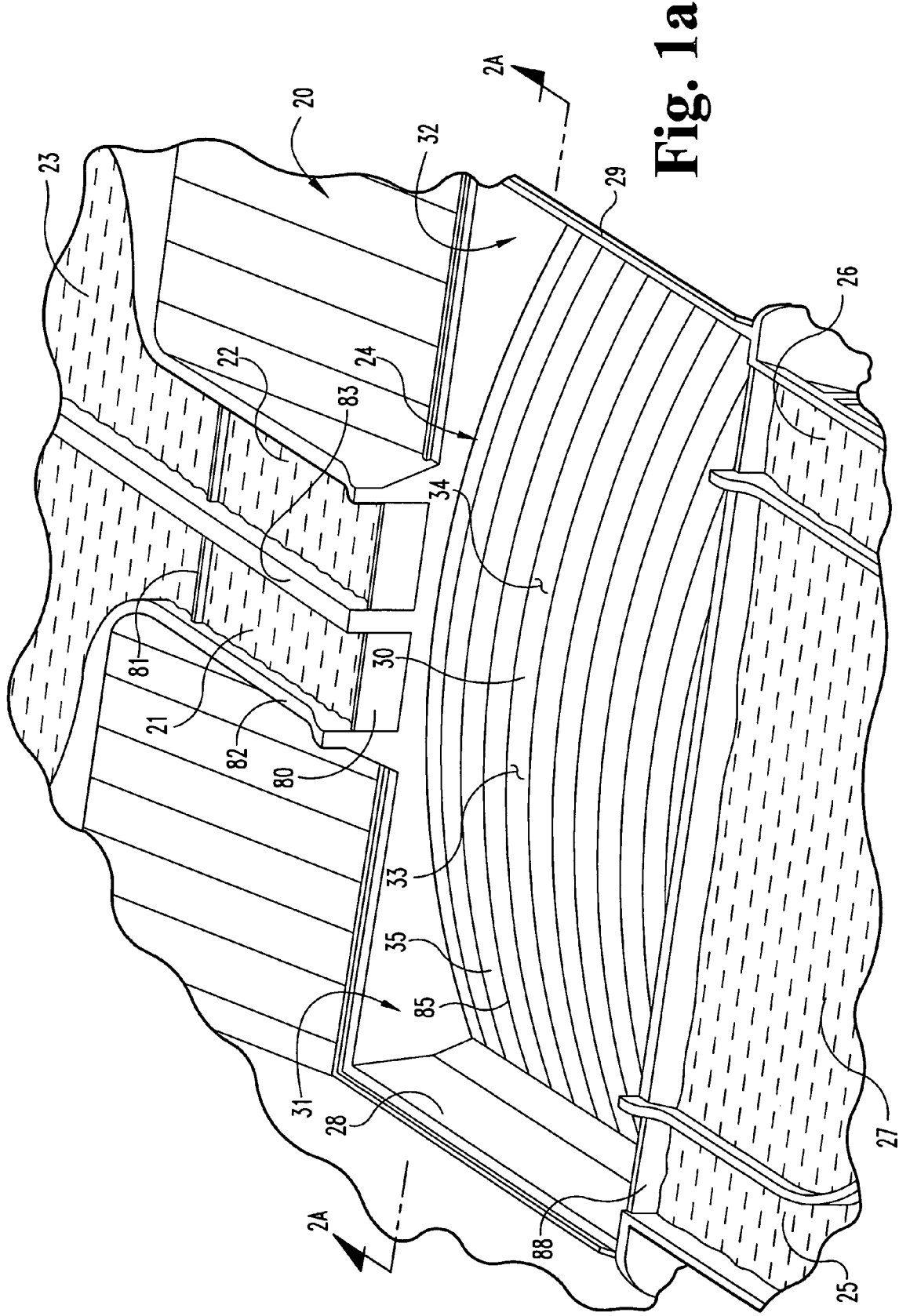

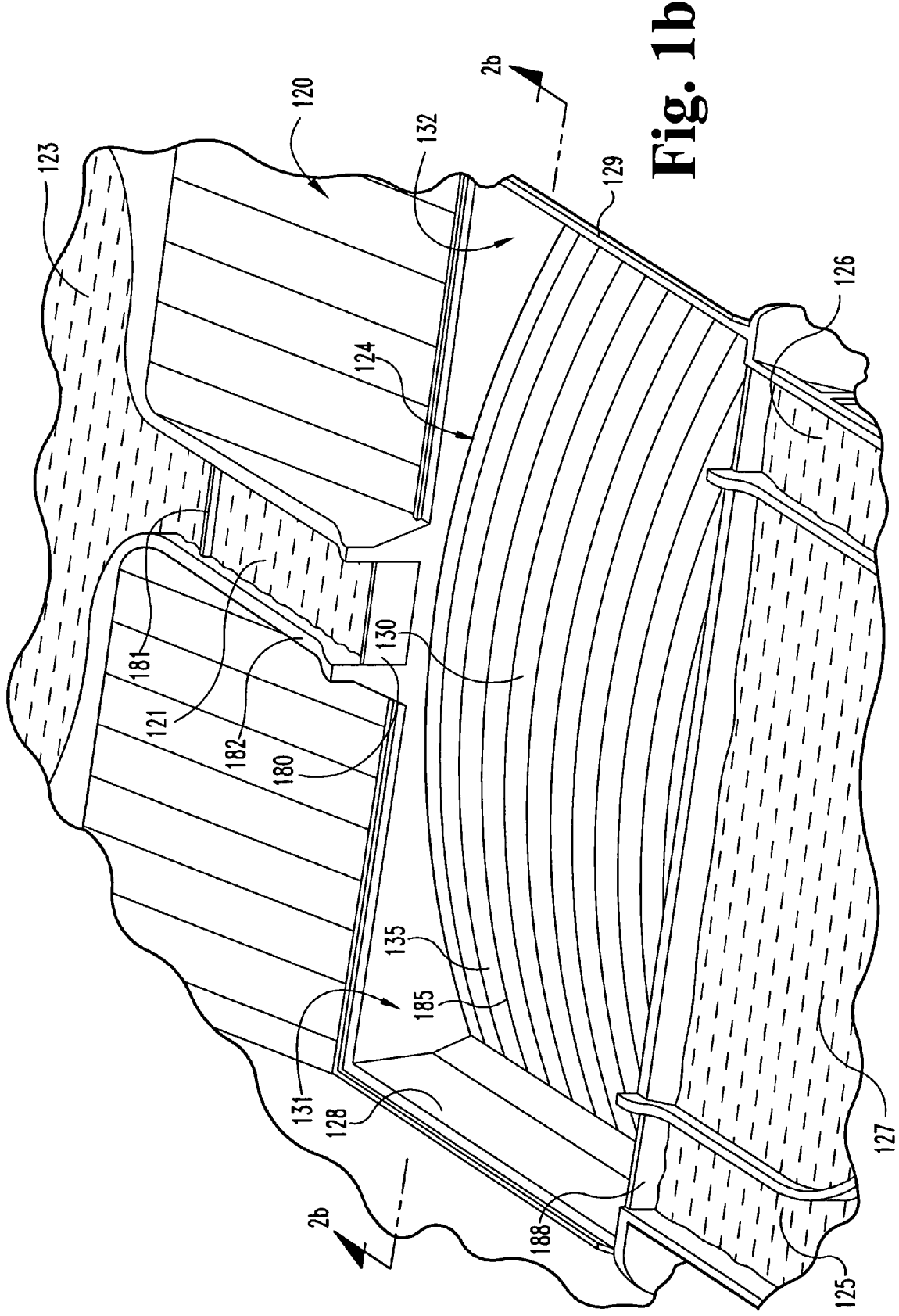

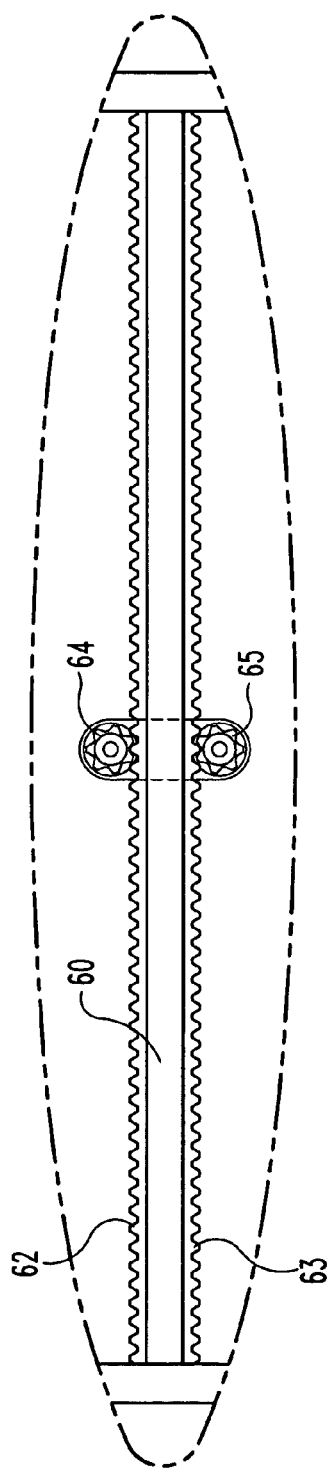
Fig. 6
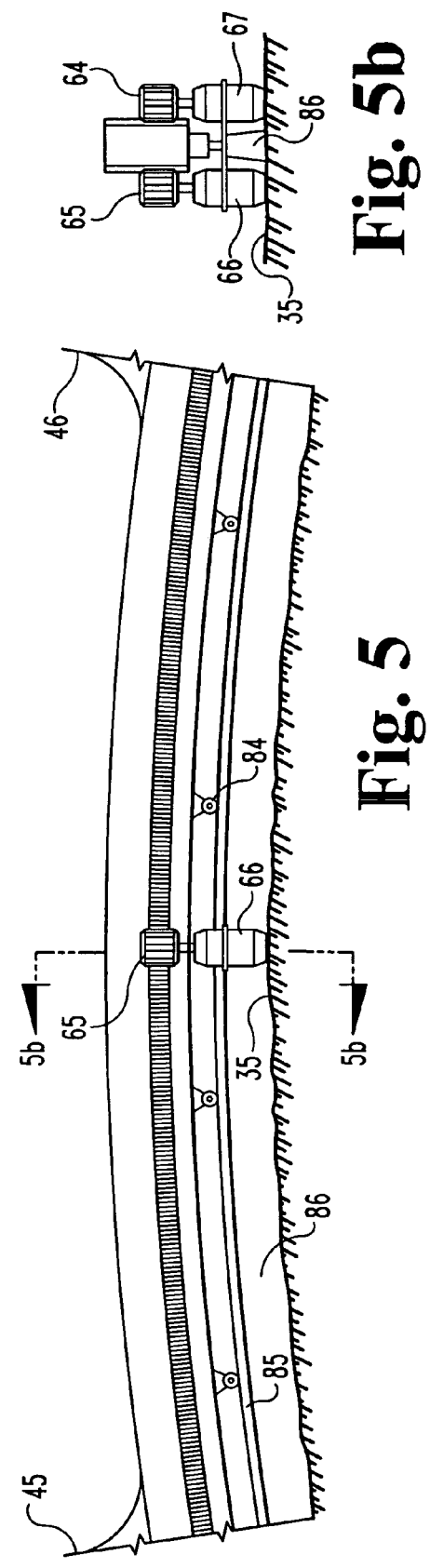
Fig. 5b
Fig. 5

MECHANICAL SHIP LIFT

BACKGROUND OF THE INVENTION

1. Field of the Invention

The present invention relates generally to the field of devices for lifting ships including canal locks and mechanical lifting devices.

2. Description of the Prior Art

As an example of a common method of lifting ships, one merely has to consider the design of the Panama Canal. Today's Panama Canal operates conventional locks raising ships three steps from one ocean to a lake then lowering them three steps again to the other ocean. Typical operation of the present day locks releases about 85 thousand cubic meters (22.4 million gallons) of fresh water to the sea each to raise and then to lower a ship. Based on a Year 2003 reported average of 38 ship transits per day, about 3.23 million cubic meters (1.7 billion gallons) of fresh water were used per day that year.

During the tropical rainy season, the present Panama Canal typically receives sufficient water to permit the highest throughput of ships. Only about half the rainy season rainfall on the canal watershed is used to lift or lower ships, some is used to generate power, but much goes out to sea unused. In contrast, dry season water reserves, enhanced by occasional rains, are at times insufficient for maximum canal throughput, a limitation costly to shippers and to the Panama Canal Authority (ACP). Enhancing water storage within the canal's watershed to span longer dry seasons has been contemplated, and should be done regardless of other future canal plans.

Two other limitations of the present Panama Canal that impact both world shipping and ACP's revenues are: 1) ships larger than Panamax Class cannot transit and 2) during periodic lock overhauls canal transits are sharply reduced. A "Panamax Class" ship is the largest that physically fits inside a present day Panama Canal lock. Without the possibility to transit their larger ships at Panama, shippers resort to costlier alternatives and Panama loses that business. The impact of lock overhauls on revenues of both the shippers and Panama is self-evident.

A new set of locks for bigger ships would be financially attractive as it would allow more ships, bigger and smaller alike, to transit the Panama Canal. Also, a new set of locks would help to reduce the relative impact of periodic overhauls on transits. It must be noted, however, that it would be impossible to eliminate overhauls with any system.

Panama's decision of if and what to build depends on the required capital investment and the return on investment the improvement project will provide. The improvement project includes widening, deepening, and straightening navigation channels in addition to building new locks and dams. Naturally, lowering the cost of the improvement project and maximizing the utility of the improvements would increase the chance of the project being financially viable.

Another method of lifting ships is the counter-balance approach for simultaneously lifting and lowering floating vessels. A working example of such a mechanism can be found on the waterway between Edinburgh and Glasgow, Scotland. The Scottish device, named the Falkirk Wheel, consists of two chambers mounted on opposite ends of balance "beams" that rotate on an axis halfway between the two chambers. The chambers "hang" like pendulums on the ends of the "beams" to stay upright. Being equidistant from the axis of rotation, the chambers counter-balance each other. When chamber positions are transposed, the lifted chamber docks and seals with the upper waterway aqueduct to allow boats to enter or exit. The lowered chamber dips into the lower waterway where boats also enter or exit. The Falkirk Wheel is relatively small and lifts or lowers relatively small boats or barges a height of 35 m (115 ft). A giant Falkirk Wheel for lifting and lowering the biggest of ships is not practical. The lift disclosed herein has a distinct advantage over other ship lifts in that a pair of chambers, connected to each other with a large number of beams, are always on the ground. Major equipment failure may stall translation of the chambers, but structural collapse is highly unlikely.

Given the configuration and lift height of the Falkirk Wheel, it is not feasible to greatly increase the dimensions of the chamber to handle much larger vessels. Geometry alone will limit how much a Falkirk Wheel chamber can be enlarged to fit larger vessels for a given lift height. From the perspective of geometry alone, if the lift were higher then the maximum vessel could be larger whereas if the lift were lower the maximum vessel would be smaller. There are structural and material limitations to contend with when changing dimensions. Further, the Falkirk Wheel may not be practical when considering the tide range at the Panama Canal.

Disclosed herein is the Shelton Ship Lift (SSL) that requires capital investment comparable to the favored concept of the Panama Canal Authority (ACP) yet it can yield improved return on investment. Potential benefits include: 1) costly watershed enlargement is not necessary to meet the modest water/power needs for SSL operation; 2) the SSL can transit as many ships per day as the single lane concept presently being considered by Panama, but uses less than half the water/power; and, 3) a stretched version of the SSL to raise/lower multiple ships can increase ship throughput.

By using the SSL, excess canal watershed water can be made available for other uses, such as for the generation of hydroelectric power, for crop irrigation, or for drinking.

SUMMARY OF THE INVENTION

The Shelton Ship Lift (SSL) fills the need for a lock system that can move very large ships between waterways of differing elevations with the smallest possible expenditure of energy and release of water. Furthermore, the systems configuration offers safer operation with lower risk as compared to other mechanical designs.

ACP favors a three-step water operated concept for its new locks, one that is more water efficient than the existing type of locks; however, at peak operating capacity the new locks will release more fresh water than what rainfall within the present day canal watershed can provide. Thus, the watershed will be enlarged in order to operate the new concept and that will add to its cost. The Shelton Ship Lift (SSL) does not require more water than currently available in the Panama Canal watershed.

The counter-balanced Shelton mechanical ship lift simultaneously raises and lowers ships, yet expels a relatively small volume of water in the process. The device operates using significantly low amounts of power as compared to other comparable ship lifts. Because the device moves ships in both directions simultaneously and affords the possibility of using longer chambers to move more ships at the same time, more transits per day are possible. Beyond meeting Panama's needs, the SSL can benefit other places in the world that need locks, but lack the water and/or the power resources needed by other lock systems.

BRIEF DESCRIPTION OF THE DRAWINGS

FIG. 1a is a perspective view of the preferred embodiment of the ground site constructed between an upper and lower waterway for receiving a movable ship chamber pair, this view depicting two aqueducts to the upper waterway. (For clarity, sea gates are shown closed and the normally water-filled cavity is shown empty to expose shape of bottom, layout of rails, etc.)

FIG. 1b is a perspective view of an alternative embodiment of the ground site, this view depicting a single aqueduct to the upper waterway.

FIG. 3a is a top view of the ship chamber pair of FIG. 2a.

FIG. 5 is a cross-sectional elevation view of the drive mechanism taken along the line 5-5 of FIG. 4 and viewed in the direction of the arrows.

FIG. 5b is a cross-sectional end view of the drive mechanism taken along the line 5b-5b of FIG. 5 and viewed in the direction of the arrows.

FIG. 6 is an enlarged view of one of the drive mechanisms of FIG. 4

DESCRIPTION OF THE PREFERRED EMBODIMENTS

Figure 2A:
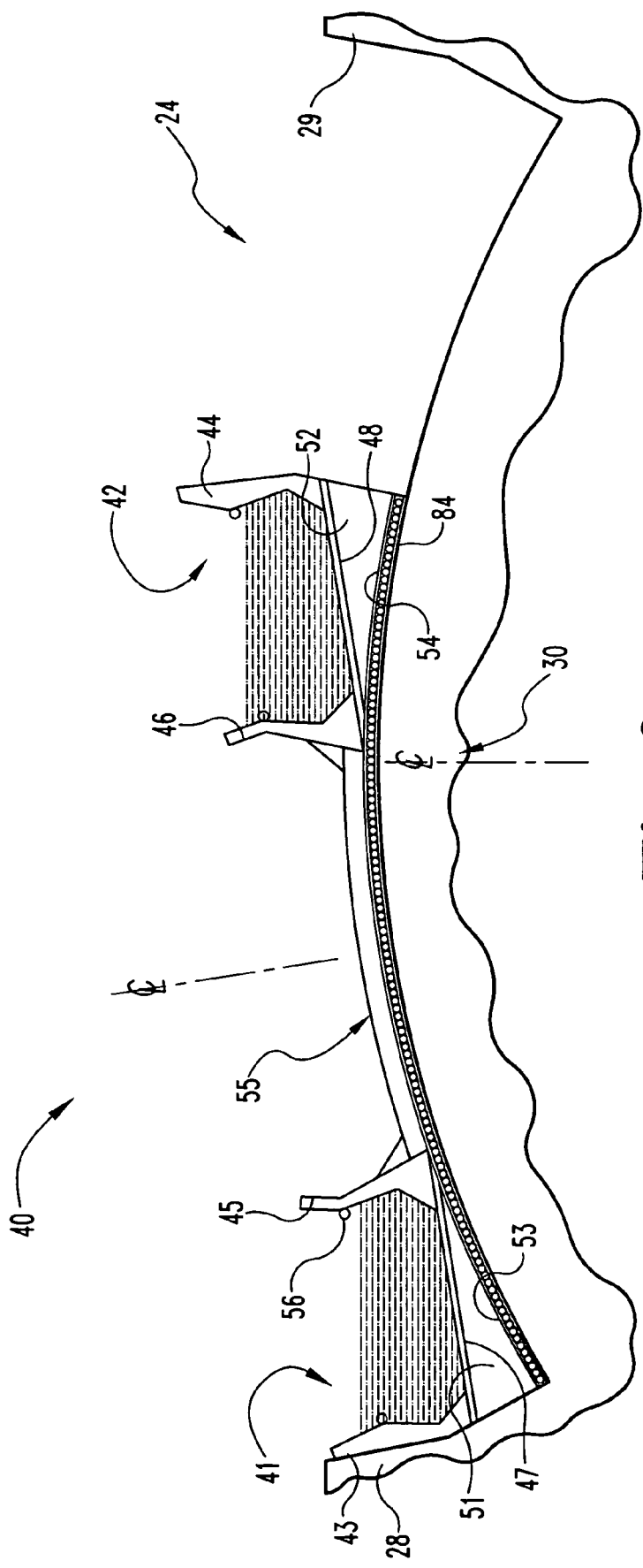
FIG. 2a is a cross-sectional view of the ground site taken along a line and viewed in the direction of the arrows 2A-2A of FIG. 1a and also illustrating the position of the movable ship chamber pair of the preferred embodiment located therein.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The SSL, disclosed herein, is well suited for the biggest of ships. My ship lift, consisting of two chambers rigidly connected by beams, moves about a fixed axis-of-rotation, but not about the complete circle and not with the chambers at opposite sides of the circle. The SSL's symmetrical chamber pair moves, or translates, along a relatively short arc of a very big circle, an arc that can be simply described as a ridge of constant curvature. The lowered chamber moves down hill on one side of the ridge dipping into the lower waterway while the lifted chamber moves up hill on the other side of the ridge out of the lower waterway to dock and seal with an upper waterway aqueduct. Because of its unique configuration, the SSL uses curved beams rather than cables to connect the two moving chambers. The SSL uses buoyancy in concert with each chamber's position on the curved slope of the supporting ridge to minimize system imbalance or lifted weight thereby optimizing the energy required to translate the chambers.

Referring now more particularly to FIG. 1a, there is shown a perspective view of a ground site constructed between an upper waterway and a lower waterway for receiving a movable pair of ship chambers. Ground site 20 includes a pair of aqueducts or channels, 21 and 22, that lead from the upper waterway 23 to the water cavity 24 (normally wet, depicted dry for clarity). A pair of lower aqueducts, 25 and 26, lead from water cavity 24 to the lower waterway 27.

Standard construction techniques may be utilized to construct ground site 20. For example, concrete and steel may be utilized to construct the various walls of cavity 24 as well as the upper aqueducts 21 and 22 and the lower aqueducts 25 and 26.

The bottom or floor 35 of cavity 24 is curved. The shallowest area of the cavity is located at the mid-point 30 between upper aqueducts 21 and 22, and the cavity bottom curves downward to either side. Adjacent and to either side of mid-point 30 are formed a pair of relatively shallow water areas, 33 and 34, that align respectively with upper aqueducts 21 and 22. Farther to either side, adjacent respectively to sidewalls 28 and 29, are formed a pair of deepwater areas, 31 and 32, that align respectively with lower aqueducts 25 and 26.

The SSL "axis-of-rotation" is a hypothetical line geometrically located at considerable depth below ground. About that axis, an imaginary "axle" of very large radius is defined. Two symmetrically constructed chambers are set parallel to that axis by length, one to each side of top-center of the "axle", with beams rigidly connecting the pair. Transversely oriented structural elements attached at regular intervals on the underside of each chamber are curved to match the radius of the "axle" and have rollers or wheels that ride on the rails of the "axle". The SSL chambers and connecting beams translate on only a portion of that imaginary "axle"; thus the "axle" simply becomes a submerged manmade ridge of defined curvature, width and length, located in a water-filled basin or cavity.

The SSL chambers are sized to receive ships of the maximum length, breadth and depth to be lifted. Given the desired transiting ship dimensions, the optimal ridge curvature and SSL layout are determined considering lift height, tides, operational requirements, and maintenance constraints.

Figure 3A:
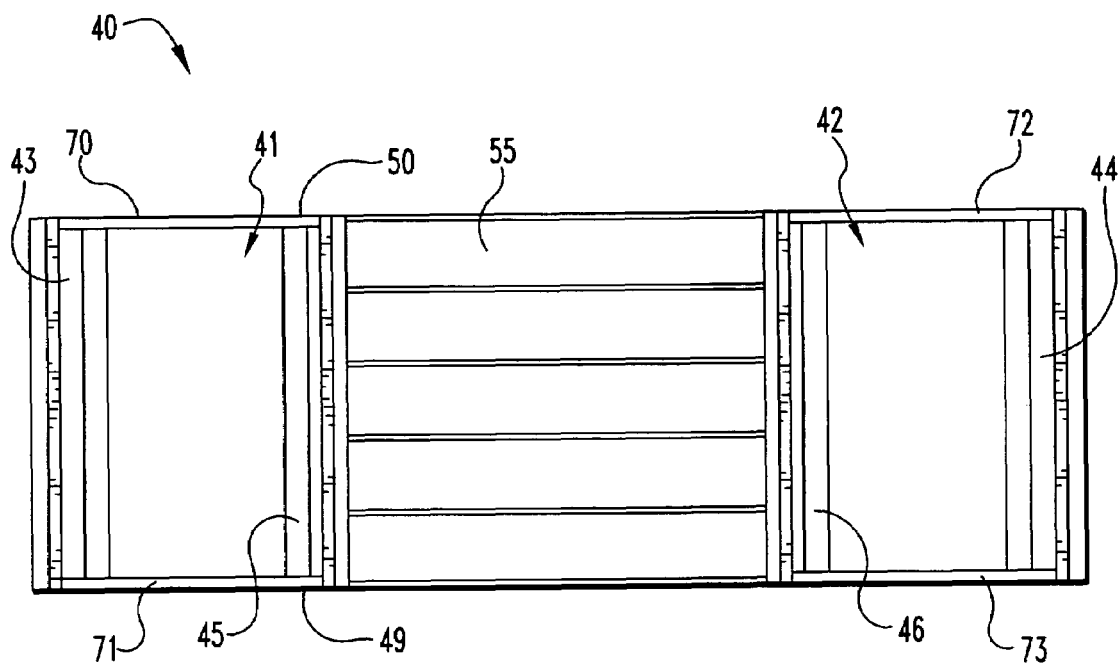

Movable unit 40 (FIG. 2a) of the SSL consists of two symmetrical chambers, 41 and 42, connected at sidewalls 45 and 46, respectively, by structure 55 comprised mainly of curved beams spanning from chamber to chamber. The distance between chamber 41's centerline and chamber 42's centerline is equal to the distance between the centerline of a lower aqueduct at one side of cavity 24 and the centerline of an upper aqueduct on the other side of mid-point 30 of cavity 24 (FIG. 1a). Thus, when chamber 41 is aligned with lower aqueduct 25, chamber 42 is aligned with upper aqueduct 22 (FIGS. 1a and 2a). Likewise, when chamber 41 is aligned with upper aqueduct 21, chamber 42 is aligned with lower aqueduct 26. Each of the chambers, 41 and 42, may be opened at ends 49 and 50 (FIG. 3a).

When chambers 41 and 42 are aligned with lower and upper aqueducts 25 and 22 respectively or alternatively with upper and lower aqueducts 21 and 26 respectively, chamber gates facing respective aqueducts are in position to be opened. A chamber gate facing a lower aqueduct can be opened directly; the lower aqueduct gate remains open at all times during system operation, closing only for major overhauls. A chamber gate facing an upper aqueduct cannot be opened until seals across the gap between aqueduct and chamber are engaged down the sides and across the bottom of the interface encompassing the gate openings. A chamber to aqueduct sealing mechanism similar to those used in other mechanical lift systems, except bigger, insures proper control of water within the joined chamber and aqueduct. Once seals are engaged, the gap between gates of the upper aqueduct and the aligned chamber can be flooded, after which the gates can be opened, as is standard practice with mechanical ship lifts. With gates opened, ship traffic is free to enter or exit the chambers. The gate and seal engaging procedure is followed in reverse order to prepare for translating the chambers to the alternate aqueduct alignment.

The major elements forming the two symmetrical chambers of unit 40 (FIG. 2a) are a pair of sidewalls 43 and 44 facing outboard, a pair of sidewall 45 and 46 facing inboard, and a pair of flat bottom decks, 47 and 48, that join together to form two "U-shaped" troughs. Below and transverse to each chamber and attached at regular intervals along the length of the chambers are structural walls 51 and 52 that extend down from respective bottom decks 47 and 48. Walls 51 and 52 transfer the weight of the chambers through heavily stiffened curved plates, 53 and 54, to wheels or rollers 84 attached beneath them. Structural walls 51 and 52 are located to coincide with the spacing of rails 85 on the floor 35 of cavity 24 at the ground site 20 (FIG. 1a). Walls 51 and 52 also strengthen outboard-facing sidewalls 43 and 44 against collapse from water pressure.

Connecting structure 55 (FIGS. 2a & 3a) consists of beams, with upward haunches at each end, that are placed between sidewalls 45 and 46 inline with structural walls 51 and 52 (located below the chambers at regular intervals). In addition, connecting structure 55's beams strengthen inboard-facing walls 45 and 46 against collapse from water pressure.

Given the symmetry of movable unit 40 depicted in FIG. 2a, when the chamber pair is rolled to the top of the hill, such that the centerline of that unit is directly over mid-point 30, the unit will be balanced, assuming levels of water in each chamber are equal. At this point, the effort to roll the unit will be that needed to overcome rolling resistance. In air, once pushed to either side, the unit will continue to move to the side in the direction pushed due to gravity until reaching bottom. However, there is water in cavity 24, which buoys the lowered chamber countering the effect of gravity.

When movable chamber unit 40 is at the position depicted in FIG. 2a, one chamber aligning with a lower aqueduct and the other aligning with an upper aqueduct, the movable unit can be designed to be at or nearly in balance. Balance results if the submerged weight of the lowered chamber, which is on a steeper slope (at area 31 or 32 of cavity 24), generates a downhill force sufficient to counter-balance the downhill force generated by the heavier raised chamber, which is on a gentler slope (at area 33 or 34). The SSL configuration, thereby, capitalizes on the opposing effects that buoyancy and slope have on downhill force for each chamber, such that the sum of their effects on both chambers results in a reduced out-of-balance at all positions.

The ideal condition to achieve at every position that the movable chamber unit 40 passes, when translating from one side of cavity 24 to the other, is that this moving unit's effective center-of-gravity as adjusted by buoyancy remains above mid-point 30, or the crest, of the hill. The nearer to the crest that the systems center-of-gravity remains the smaller is the downward displacement of the systems weight, and the smaller is the power expended to lift the systems weight during chamber translation.

Ridge curvature, ocean tide, chamber shape and weight, and the distance chambers must travel are evaluated in concert to define the optimum SSL configuration. Maintenance issues, affecting to long term operational procedures and costs, must be taken into account as well in establishing the configuration. For example, it is advantageous for rollers 84 (FIG. 2a) supporting the raised chamber to clear water, if possible, for inspection and even replacement when the system is stationary during exiting and entering of ships. In cases, this consideration constrains or limits reduction of travel distance.

Note that drive power requirements grow quickly as the travel distance of the movable chambers are increased, since the effective weight of the movable chamber pair is quite large. Based on industry standards, the force needed to overcome rolling resistance from weight induced friction is about 1% of the weight being moved.

The preferred embodiment of the SSL utilizes the ground site of FIG. 1a and the chambers of FIG. 2a. An alternate embodiment of the SSL incorporates a single upper aqueduct, depicted in the ground site of FIG. 1b, and the chambers of FIG. 2b. When either chamber 141 or 142 (FIGS. 2b and 3b) of said alternate embodiment reaches the upper waterway it docks at a common or shared upper aqueduct 121, one centered above the ridge crest 130 (FIG. 1b). In the preferred embodiment, separate or twin upper aqueducts 21 and 22 (FIG. 1a) to the upper waterway, one to each side of the ridge's crest, are used.

In all respects other than number of upper aqueducts, the preferred and the alternate SSL are similar and function in a similar manner. Descriptions of the ground site and details of the chamber pairs given for the preferred embodiment apply to the alternate. Thus, the item numbers in the hundred series in FIGS. 1b, 2b, 3b, 7b and 8b correspond to the item numbers below one hundred in FIGS. 1a, 2a, 3a, 7a and 7b except as noted.

Figure 4:
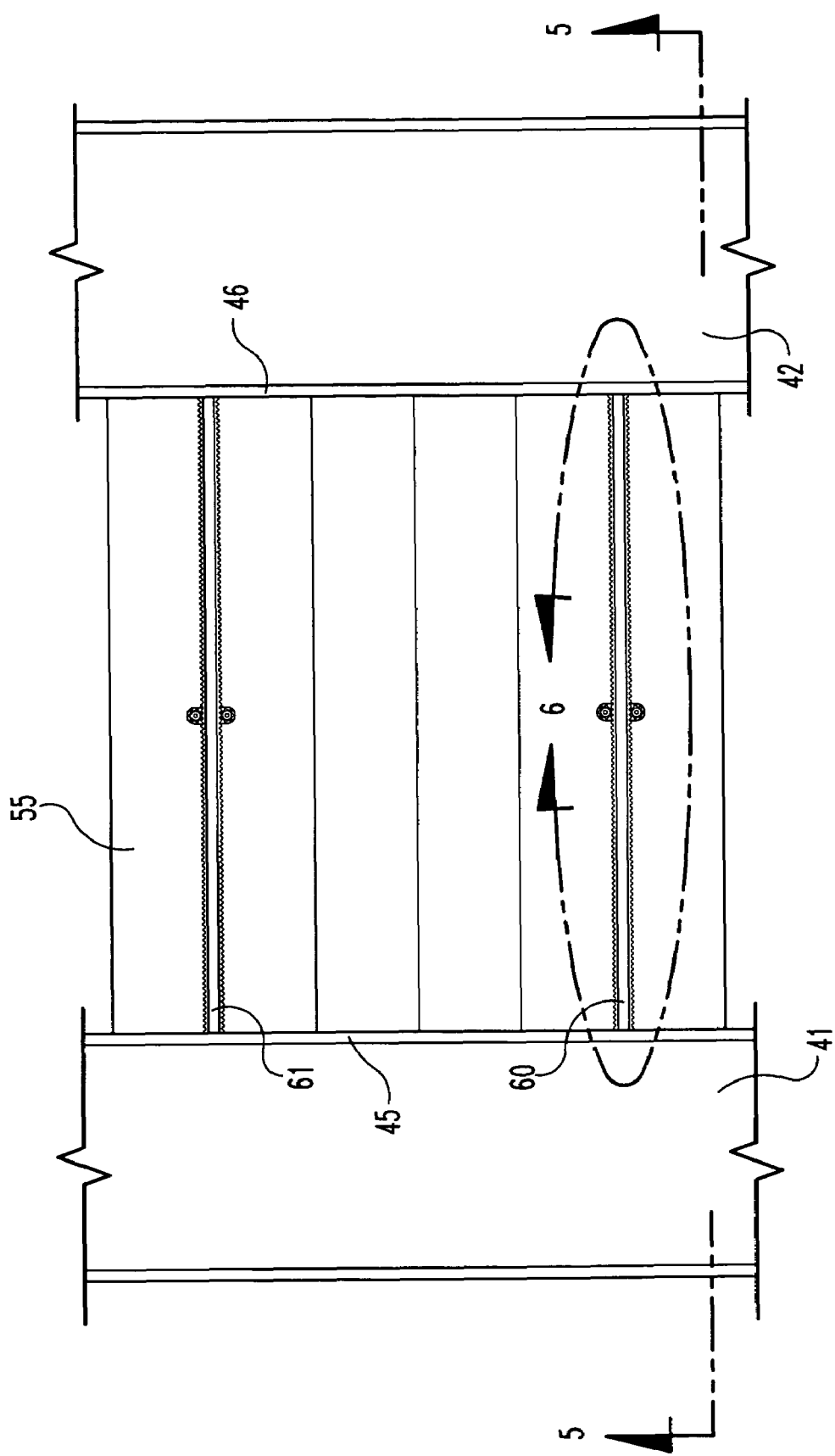
FIG. 4 is the same view as FIG. 3a only fragmented and enlarged to illustrate the typical location in plan of the drive mechanism for a movable ship chamber pair.

Methods for applying mechanical force to move chamber unit 40 may involve winches, jacks or motors, alone or in combination. For example, a motor driven rack-and-pinion system is depicted in FIGS. 4-6. FIG. 4 is a top view of the movable chamber pair with the center portion of these fragmented to illustrate a pair of racks, 60 and 61, affixed to selected beams of connecting structure 55 and extending between side walls 45 and 46. To apply to the alternative single upper aqueduct embodiment, it is necessary to adapt the rack to extend along the wall beneath each chamber (see 160, FIG. 2b), but the same drive mechanism is applicable.

Rack 60 will now be described, it being understood that an identical description applies to rack 61. Rack 60 (FIG. 6)

consists of a pair of opposite longitudinally extending edges, 62 and 63, each having a plurality of teeth formed thereon in meshing engagement respectively with gears 64 and 65 fixedly mounted to the output shaft of separate motors. For example, motor 66 fixedly mounted atop cavity floor 35 and on a side to rail foundation rib 86 has a rotatable output shaft having gear 65 mounted thereon. Operation of motor 66 results in the rotation of gear 65 thereby moving chamber pair 40 toward either sidewall 28 or 29 of ground site 20 depending upon the rotational direction of gear 65. Similarly, a separate motor 67 (FIG. 5b) is provided that is connected to drive gear 64 with both motors being timed and sequenced to provide uniform motion to rack 60. Similarly, a pair of motors with output gears are in meshing engagement with the teeth formed on each opposite extending edge of rack 61 with motor 67 driving rack 61 timed in sequence with motor 66 to impart uniform motion to rack 61 relative to rack 60. Alternatively, electric or water driven motors may be employed.

It is possible that during translation of movable unit 40, one end of the chambers could get ahead of the other end and the whole unit could end up skewed, get jammed and/or leave any track supporting the chambers. To avoid the possibility of skewing or jamming of chamber pair 40 relative to ground site 20, linked cogs may extend the length of the unit, to ensure that both ends and all points between move together.

As SSL movable chambers 41 and 42 roll together from side to side, one chamber lifts while the other lowers. As the chambers roll on the hill formed by cavity floor 35 they tilt. However, the ships carried by the chambers remain level since the water within the chambers constantly seeks level. Chambers 41 and 42 respectively have gates 70-71 (FIG. 3a) and 72-73 located at their opposite ends. The gates are shaped to accommodate chamber tilting and to contain the water at all positions. Traditional two-leaf gates, similar to those used in the existing Panama Canal Locks, with the addition of a tension link to keep the chamber walls from flexing may be used for gates 70-73. Gates similar in design to those of the existing Panama Canal Locks or another conventional design including rolling gates are satisfactory to use at the upper aqueducts 21 and 22. However, rolling gates are not satisfactory for gates 70-73. To accommodate the opening of traditional two-leaf gates, notches or slots may be provided at both ends of both sidewalls of each chamber 41 and 42.

As the water and ships are constantly seeking level when chambers 41 and 42 tilt during translation of unit 40, the chamber sidewalls will either rise or fall relative to the ships. (Chamber tilt is depicted in FIG. 2a). To vertically guide the ships preventing them from scraping the chamber walls, tire-like rolling bumpers 56 are employed. For example, tire-like rolling bumpers are used on occasion in the Panama Canal locks to help guide very wide ships and prevent scraping of the lock walls. The rolling bumpers 56, positioned facing in at regular intervals along the chamber walls 43-46 (FIG. 2a), will also laterally restrain the ships, whose momentum will causes them to press against the trailing wall of each chamber, during chamber translation.

The upper aqueducts 21 and 22 and the lower aqueducts 25 and 26 each form a port leading into the movable chamber slidably mounted within cavity 24 (FIG. 1a). For safety, the upper aqueduct should include at minimum two sets of gates some distance apart. The gates for upper aqueduct 21 will now be described, it being understood that an identical description applies for the pair of gates associated with aqueduct 22. It is further understood that the same description applies for the single upper aqueduct 121 (FIG. 1b) of the alternate embodiment. Aqueduct 21 includes a pair of spaced-apart gates, of either two-leaf or rolling design, 80 and 81 (FIG. 1), hinged or slidably mounted to sidewalls 82 and 83 of the aqueduct. Gates 80 and 81 sealingly engage sidewalls 82 and 83 to limit water flow therebetween thereby retaining the water between the gates and water of the upper waterway when the gates are in their closed position across the aqueduct.

The gate for lower aqueduct 26 is identical to gate 88 for lower aqueduct 25 (FIG. 1a). It is understood that the description of gate 88 also applies to lower aqueducts 125 and 126 (FIG. 1b) of the alternate embodiment. Gate 88 is a buoyant single piece rectangular shaped gate that can be floated into place to install and floated away to remove. Gate 88, brought to site from a remote storage facility and installed when major maintenance requires cavity 24 to be dried out, is placed across the opening to cavity 24 at aqueduct 25 and a second identical gate is placed across the opening to cavity 24 at aqueduct 26. Gates to both aqueducts 25 and 26 must be in place before water can be removed from cavity 24.

All the gates, in addition to the movable chamber unit itself, for the single or common upper aqueduct SSL alternative will in principle be of the same design as for the twin upper aqueduct SSL configuration except larger in cross-section. That is because, to be efficient, the movable chambers of the single upper aqueduct alternative need to be closer together and will consequently tilt more.

Floor 35 of cavity 24 at ground site 20 (FIG. 1a) supports a plurality of parallel and spaced apart rails 85 extending between sidewalls 28 and 29 with the rails that have a convex configuration as viewed from above. The heavily stiffened plates 53 and 54 beneath the chambers and beams 55 connecting the chambers of the movable unit 40 (FIG. 2a) are curved being complementary to the curved shape of the rails 85 supported by floor 35 and rail foundation rib 86 (FIGS. 5 and 5b). A bed of rollers 84 is located between bottom elements (53, 54 and 55) of movable chamber unit 40 and rails 85 of cavity 24.

The SSL has a single interface of motion that is between a bed of rollers 84, presumably housed in roller box units that are mounted to the curved underside of the movable chamber unit 40, and ridge rails 85. This interface is comprised of numerous rails straddling the ridge, upon which ride numerous matching lines of rollers supporting the chamber unit at regular intervals along its length. The single interface of motion could alternatively be established using other wheel or sliding mechanisms besides roller units. Alternatives, such as Hillman Roller, linked rollers, heavy-duty roller bearings, railcar wheels, magnetic levitation, and levitation by way of high-pressure water cushion, are a few possibilities. The twin upper aqueduct SSL case developed for the Panama Canal incorporates the use of individual wheels or roller sets that can be inspected and maintained or replaced while the SSL is operating. Wheel or roller replacement may be performed beneath the raised half of the system during periods of lower tide.

Figure 7A:
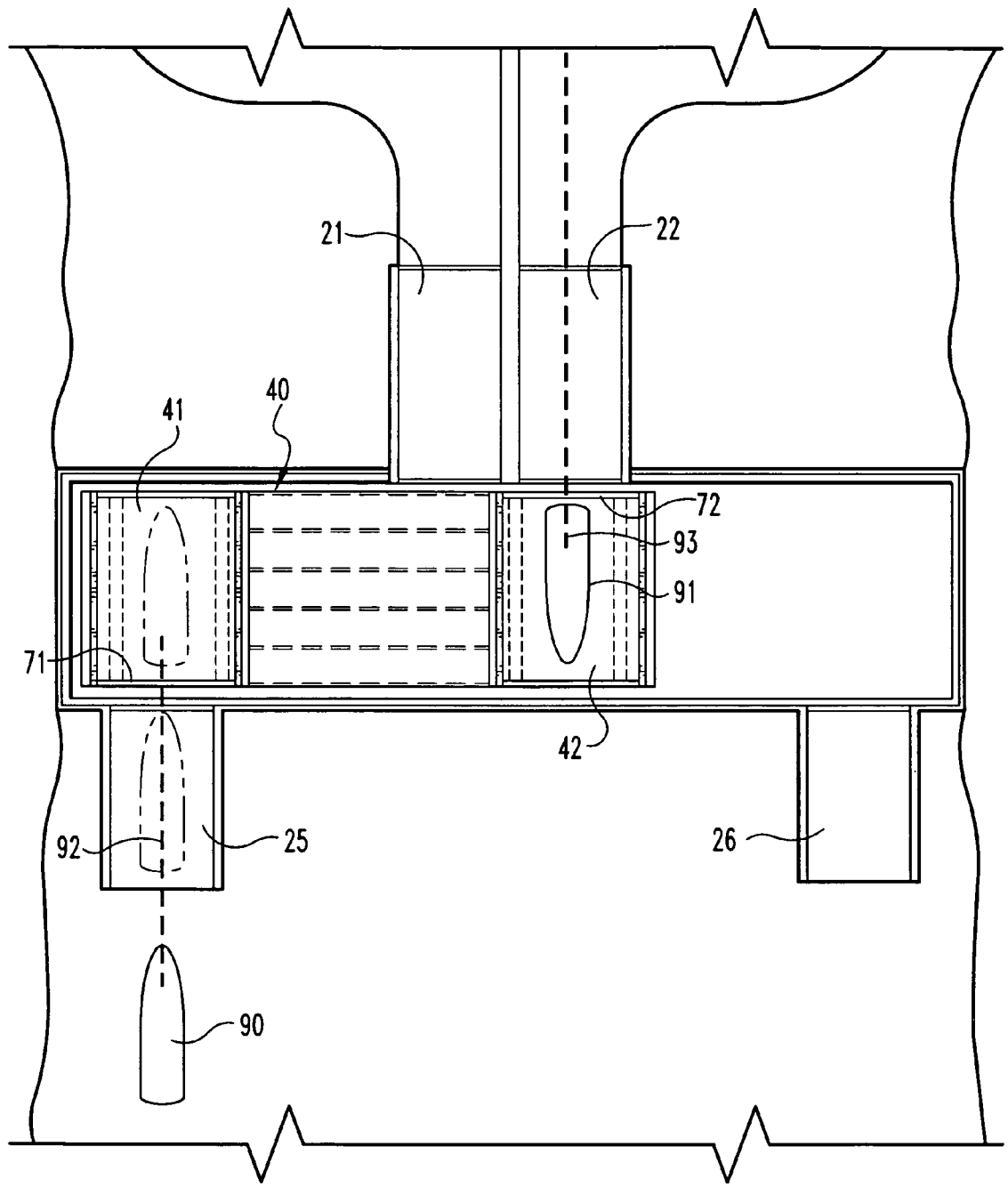
FIG. 7a is a schematic diagram and top view of the movable chamber pair within the preferred-embodiment ground site illustrating a first ship entering the ship chamber for the first ship to be moved to a higher elevation whereas a second ship is positioned within the ship chamber for the second ship to be moved to a lower elevation.

The movable chamber unit 40 (FIG. 2a) is rolled or translated from one side to the other of cavity 24 powered by motors driving several rack and pinion units (FIGS. 4-6). In that operation one chamber is lowered and the other chamber is raised. For the purposes of discussion, assume chamber 41 is lowered and chamber 42 is raised as depicted in FIG. 7a. To arrive at this position, chamber 41 will have simply sunk into the water in cavity 24 aligning with lower aqueduct 25 while chamber 42 will have risen to level and aligned with upper aqueduct 22. Assuming the lower waterway is a tide-affected ocean, the power required to complete unit 40 translation will vary with the tide, but, otherwise, ensuing operations for handling ships are indifferent to tide.

At arrival after the drive motors stop and brakes are engaged, seals between the upper aqueduct 22 and raised chamber 42 encompassing the gates of each are engaged so that the space between chamber gates and aqueduct gates can be flooded, and the gates can then opened. The gate of lowered chamber 41 that faces aqueduct 25 is simply opened, as the chamber is level with the waterway. Mule rails atop the walls of both the raised and the lowered chambers are connected to those atop the walls of the respective upper and lower aqueducts, so that the mechanical mules guiding the ships may cross. After completing ship-moving operations, and with new ships in both the upper and lower chambers, the process is reversed for departure. Gates are shut, rails are disconnected, water between gates is dumped and seals around the gates are released where applicable, and brakes are disengaged before chamber unit 40 can translate to the other side of cavity 24 (FIG. 8a) where the entire procedure repeats.

Figure 2B:
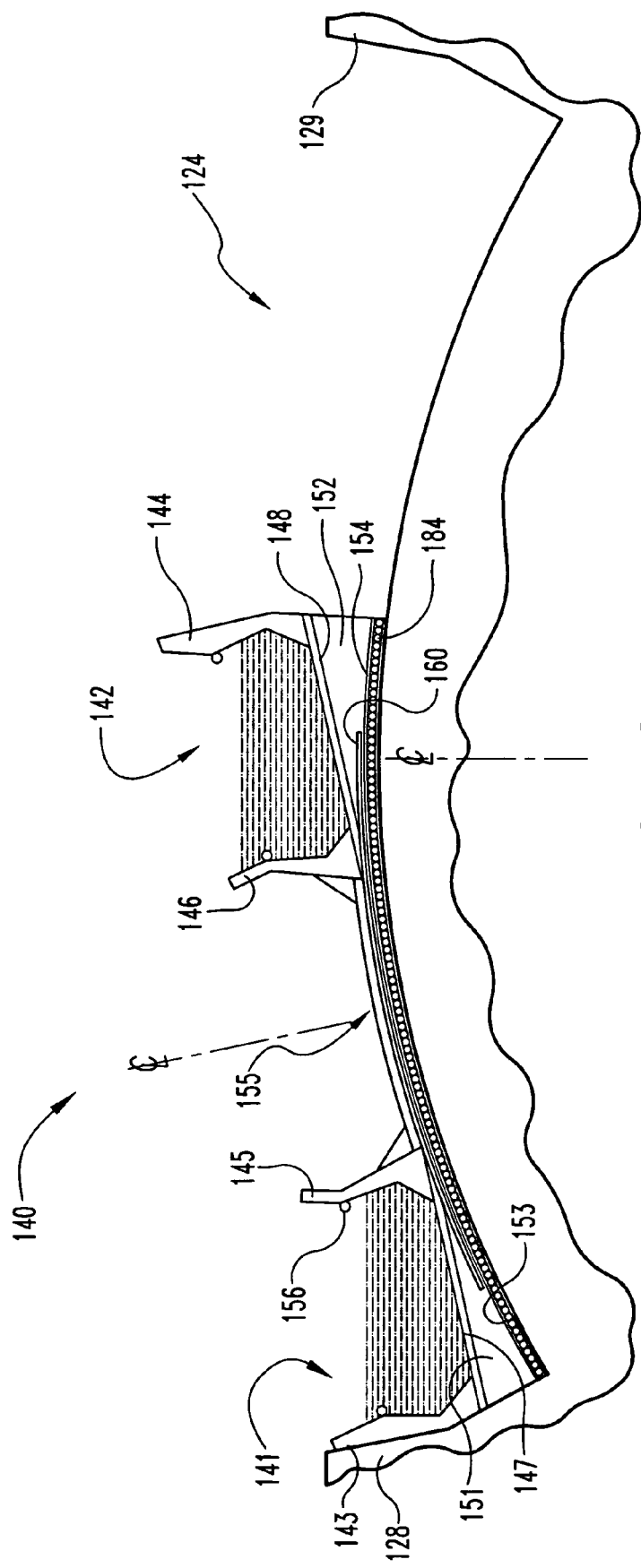
FIG. 2b is a cross-sectional view of the ground site taken along a line and viewed in the direction of the arrows 2B-2B of FIG. 1b and also illustrating the position of the movable ship chamber pair of the alternative embodiment located therein.
Figure 3B:
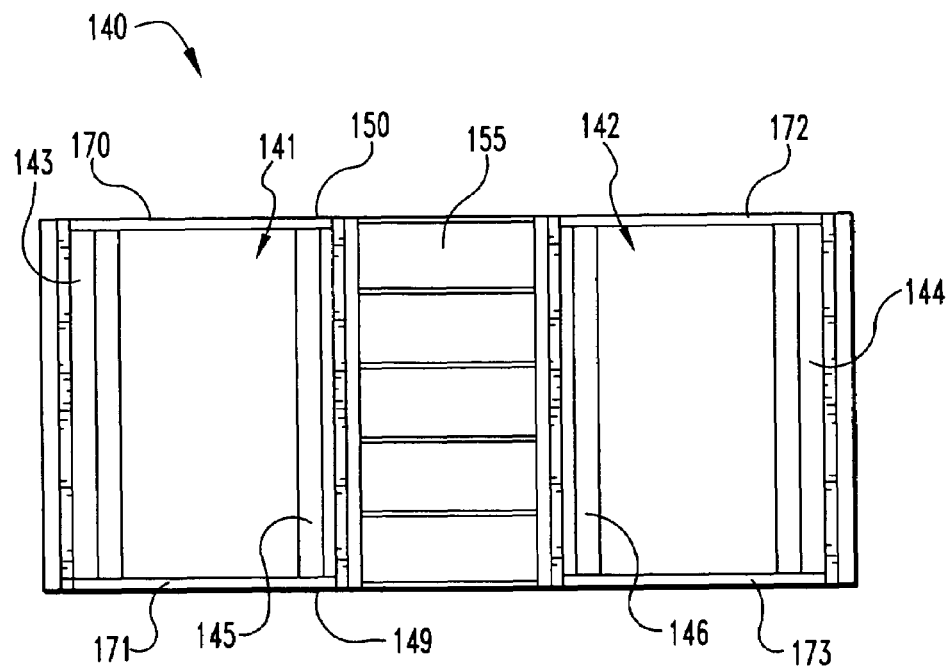
FIG. 3b is a top view of the ship chamber pair of FIG. 2b.
Figure 7B:
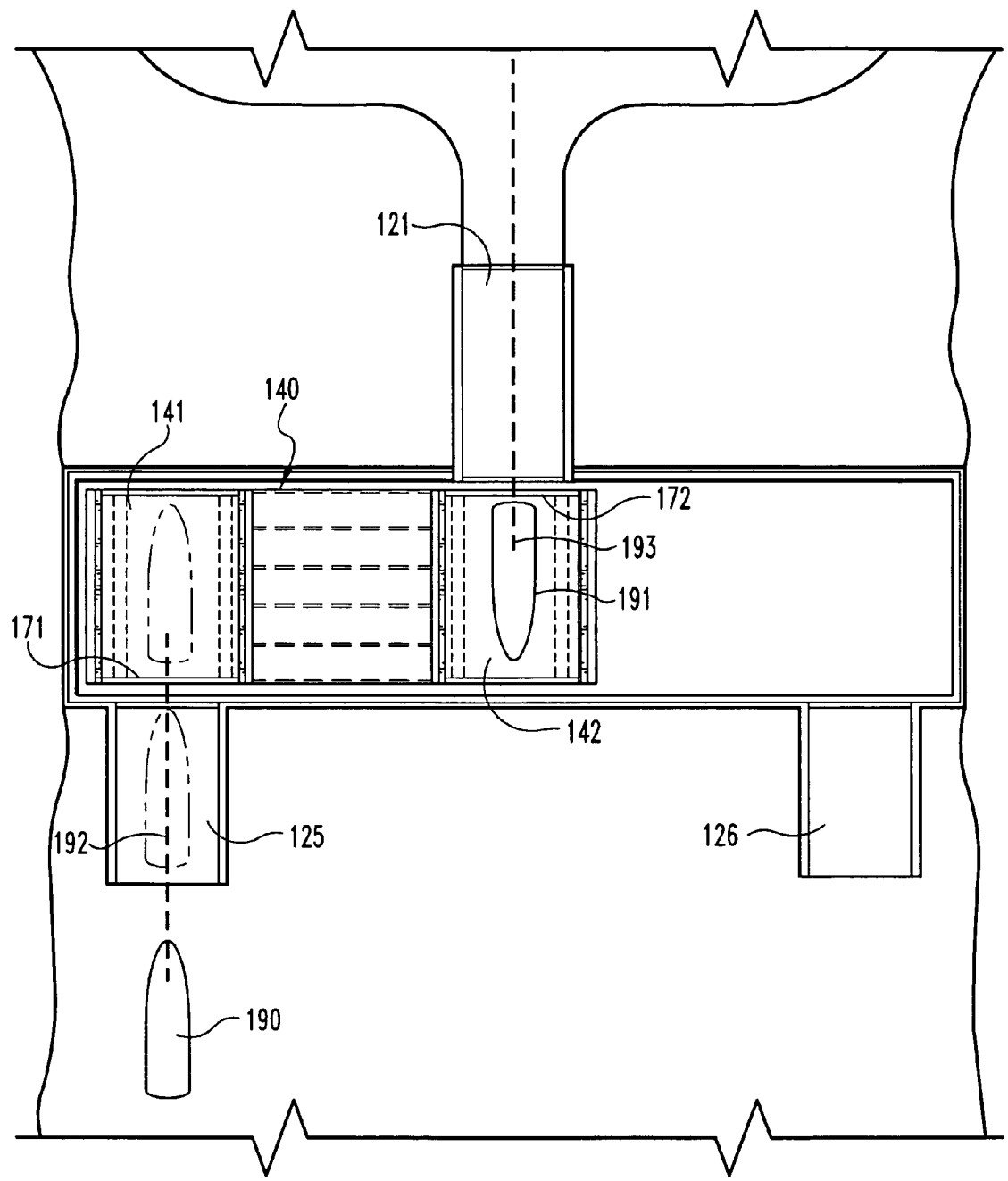
FIG. 7b is a schematic diagram and top view of the movable chamber pair within the alternative-embodiment ground site illustrating a first ship entering the ship chamber for the first ship to be moved to a higher elevation whereas a second ship is positioned within the ship chamber for the second ship to be moved to a lower elevation.

The ground site 120 (FIG. 1b) of the alternate embodiment has a similar plurality of rails on which rollers ride carrying the respective movable chamber unit 140 (FIG. 2b). With the exception that there is only one upper aqueduct for each chamber to align with, the ship-moving operations described previously and following apply similarly to the alternate embodiment as depicted in FIGS. 7b and 8b.

Figure 8A:
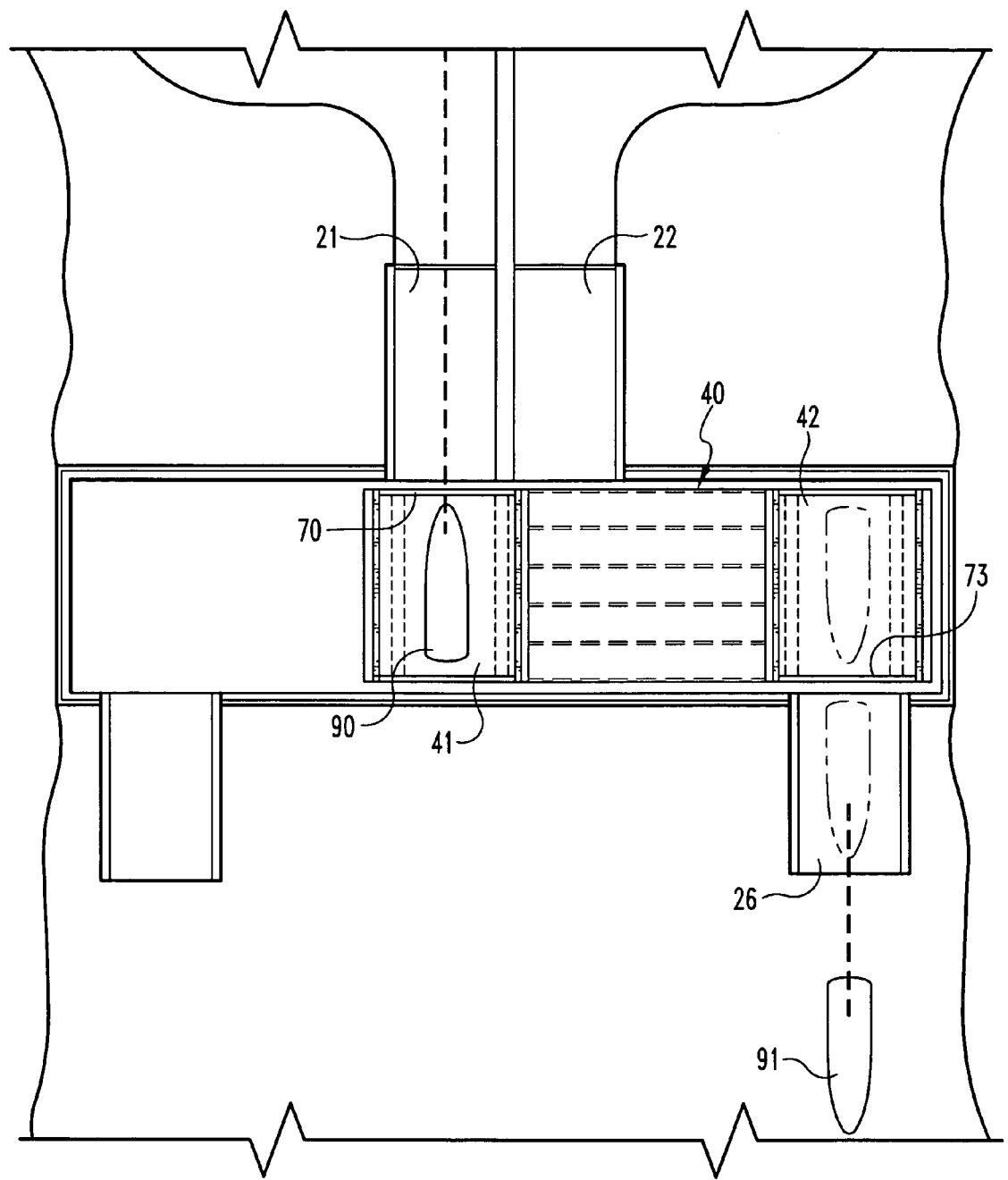
FIG. 8a is the same schematic diagram as shown in FIG. 7a only illustrating the first ship with the ship chamber aligned with the exit to the higher elevation whereas the second ship has exited to the lower elevation.
Figure 8B:
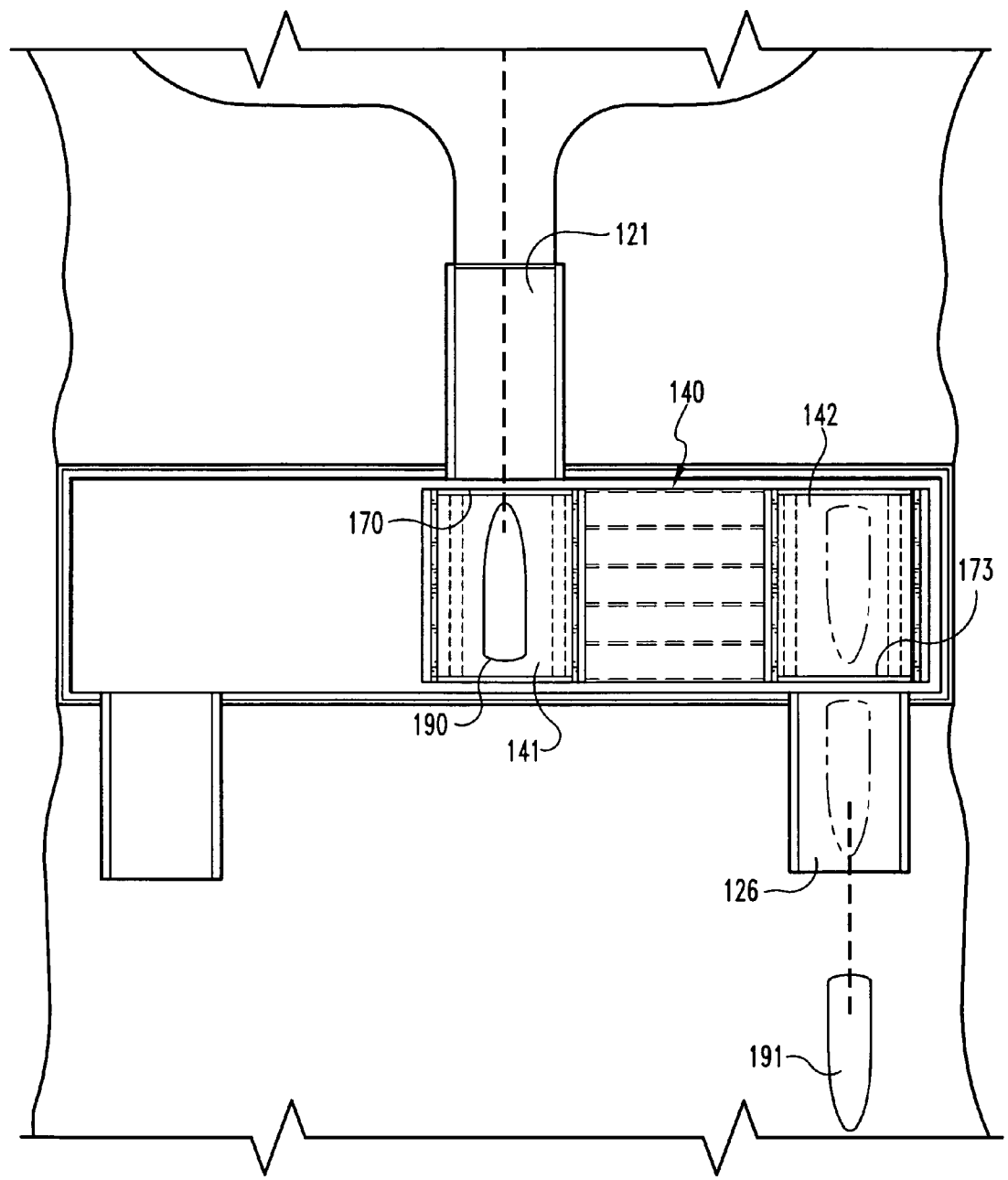
FIG. 8b is the same schematic diagram as shown in FIG. 7b only illustrating the first ship with the ship chamber aligned with the exit to the higher elevation whereas the second ship has exited to the lower elevation.

Reviewing SSL operation by the numbers, FIGS. 7a and 8a show the movable chamber unit 40 laterally moved from a first position depicted in FIG. 7a to a second position depicted in FIG. 8a. In FIG. 7a, a first ship 90 enters lowered holding chamber 41 via lower aqueduct 25. Likewise, a second ship 91 moving in an opposite direction to ship 90 is moved into raised holding chamber 42 via upper aqueduct 22. Movable chamber unit 40 is then moved to the second position shown in FIG. 8a allowing ship 90 to exit the now raised holding chamber 41 via upper aqueduct 21 while ship 91 exits the now lowered holding chamber 42 via lower aqueduct 26. When the movable chamber unit 40 is in the first position (FIG. 7a) the longitudinal axis 92 extending though ship 90 is aligned with the longitudinal axis of lower aqueduct 25 and lowered holding chamber 41 whereas the longitudinal axis 93 of ship 91 is aligned with the longitudinal axis of upper aqueduct 22 and raised holding chamber 42. When the movable chamber unit 40 is rolled laterally to the second position depicted in FIG. 8a, the longitudinal axis of each ship align in a similar manner with aqueducts 21 and 26.

A movable unit chamber of The Panama Canal SSL case developed for purposes of assessing this concept overall is about 68.6 m (225 ft) wide, 41.1 m (135 ft) tall, and 503 m (1650 ft) long. The inside cross-section of the chamber (space for a ship) is 200 ft wide by 58 ft deep. When out of the water, and full of water, each chamber weighs about 800 thousand metric tons. The beam system connecting the chambers weighs about 30 thousand metric tons. Other miscellaneous elements (mules, mule rails, bumpers, etc.) add another 10 thousand metric tons. To improve balance conditions and reduce operating requirements of the Pacific end SSL due to tide effects, about 130 thousand metric tons of heavy ballast is added.

At low tide, with chambers at mid-translation, the maximum load on the rails is around 1.6 million metric tons for the Pacific end SSL. Using the industry standard rule-of-thumb of 1% of weight on the wheels as the rolling resistance force, a 16 thousand metric ton force is required to overcome rolling resistance alone at this position. At other positions the force to overcome rolling resistance will be lower as the total vertical force will be reduced by buoyancy. The force for rolling will be further modified, either added-to or reduced, by system imbalances at those other positions.

For reference, the current Panama Canal locks lift ships an average of 26 m (85 ft) in three steps. With chambers 33.5 m (110 ft) wide by 305 m (1000 ft) long lifting or lowering ships one-third of the 26 m at a time, the potential energy in water used for standard lockage is about 2.5 million ton-meters per ship; 1.25 million ton-meters is used if water is cross-locked. A Panamax size SSL was assessed and was found to use about 650 thousand ton-meters of equivalent energy (accounting for power conversion losses), which is about one-quarter of standard lockage or half of cross-locking.

For the post-Panamax Panama Canal SSL described earlier, about 3.9 million ton-meters of equivalent energy will be require to move the chamber pair, lifting and lowering ships. That figure includes a multiplier of 1.5 for generation, transmission and conversion losses, assuming all electric power is used. Direct drive hydro-motors could alternatively be used to improve on the losses. The 3.9 million ton-meters power needed for operate an SSL is less than one-quarter of what is required to operate a post-Panamax sized traditional two-lane three-step set of locks.

Overcoming rolling resistance and moving weight uphill are the two primary energy consumers in operating an SSL. System momentum and water resistance also put demands on the drive system, but those are very small as compared to the first two. With respect to water resistance, at the very slow rate of movement across the basin, water resistance is very low and can be kept that way if adequate passages are provided under the chambers, between basin halves and to the sea.

Each time the SSL completes a translation, the lifted chamber docks and seals to the upper aqueduct and gates of the chamber and the aqueduct are opened. Also, the gates of the lowered chamber are opened. Exiting ships are manoeuvred out of the chambers and must sail clear so that the next ships can position and enter the chambers. With the next ships in place, gates can be closed and seals released in readiness for translation of the chambers. It is estimated that the time required for post-panamax ship movements to occur (exit and entry) will be about 2 hours. Chamber translation time is estimated at about 1 hour to move about 185 m.

For comparison, it is estimated that the time to get the same post-panamax ship in and out of the first lock of a three-step lock set so that the next ship can do the same is about 1.5 hours. Thus, the throughput of an SSL would appear to be about the same as that of a three-step single lane lock set.

However, the SSL has a significant advantage. The chambers can be made longer while the entry and exit structures remain the same. Several ships may be loaded into the elongated version. The number of ships raised and lowered per translation may be doubled or more, which would reduce the translation time required per ship, thereby increasing the number of transits.

Success of the SSL is dependent on minimization of imbalance that must be overcome by applied force. The weight having to be moved or lifted is constantly changing as the SSL translates due to the interaction of weight and buoyancy, including tide effects, and the change in position on the ridge. At low tide, greater work must be done to move the chambers to mid-way of travel and less work the other half of the way. At high tide more work is done past mid-way than during the first half of travel. The Pacific end Panama Canal SSL was optimized by adding ballast weight to reduce the high tide peak and total translation force as much as possible which increased the low tide total translation force, but minimized total energy expended across all tides.

The SSL rollers are designed to be the wearing part, as these can be routinely replaced during operation; it would be difficult to routinely maintain the rails on the ridge, so those must be designed to last. With drive mechanisms, parts that can be removed and replaced relatively easily without lengthy shutdown or delays in operation should be designed to absorb wear and tear; parts that are hard to replace should be designed to last, protected by the wearing parts. There should be sufficient redundancy in mechanical devices that move the chambers such that, should a motor, jack or pump become ineffective, the system will still move, though possibly more slowly, while the item is replaced.

Maintenance of a system that continuously rises out of and sinks into the sea is an important subject to consider at length. Materials selected for building the SSL unit must be either highly resistant to corrosion or measures must be taken to control corrosion that minimize maintenance as well as construction costs.

An expensive approach to reduce maintenance would be to build the SSL completely of a stainless steel. It may be adequate and less costly to build the system of lower cost structural steel and to clad exposed, hard to maintain surfaces with a corrosion resistant material.

To overhaul the rails and the basin itself, the entire unit would have to be shut down, basin gates installed and the basins pumped out. The need to dry out the basin can be greatly curtailed by good design, quality construction, and effective corrosion control.

An environmentally sensitive side effect of locks and lifts between a salty ocean and a fresh water lake is the migration of salt water from the ocean to the lake known as saltwater intrusion. This issue is of significant concern with respect to the Panama Canal. The Shelton Ship Lift (SSL) would raise a salty mixture of water to the lake level. For completeness, a discussion of a way to mitigate the problem is presented.

With regards to this problem, the SSL chambers carry a large fraction of seawater to the lake level. The water surrounding the ship in an SSL does not get diluted several times as occurs in a traditional lock where fresh water is added at each lift. While the traditional lock uses more lake water than an SSL, the greater water use in the traditional lock has the beneficial effect of reducing salt content by dilution.

It is possible to limit or arrest saltwater intrusion and make usable energy in the process by establishing a flow-barrier. Water can be flushed at the right flow rate from the raised chamber or upper aqueduct to arrest intrusion of saltwater into the lake. Power produced by that water could be used to operate mules and other equipment right at the locks or, coordinating with the power grid, power production may be sold.

Design of the rollers, and of the accompanying race or rail system, is by far the most critical element of the Shelton Ship Lift. As was noted earlier, it would be ideal if the rollers bore the brunt of wear and tear reducing rail maintenance needs. Nonetheless, an efficient method for maintaining the rails will be needed. Identifying ways to reduce rolling or other resistances to translation is of high value with this system.

To accommodate imperfections in the curvature of the rails on the ridge it would be prudent to develop rollers with improved elastic properties that could perhaps deform more than a typical solid steel roller, to better share weight among rollers as the gap between the races or rails fluctuate. Rollers comprised of a steel shell and a neoprene core may serve such purpose.

Many advantages exist with the ship lift disclosed herein as compared to the prior art devices. For example, while components of the system are moving vertically an amount equal to the difference in elevation between the upper and lower waterways and in addition, are moving side to side significant distances, the center of gravity of the system displaces relatively small distances. The vertical displacement of the center of gravity is a fraction of the elevation differential between the upper and lower waterways. For the Panama Canal case evaluated, the effective vertical displacement of the full weight of the system was estimated at less than 15% of the waterway elevation differential.

Work is principally done to overcome rolling resistance of the carriage on the rollers atop the rails as the position of the carriage is changed. When the position of the carriage is changed, the shift in position of its weight is counteracted by a shift in position of the buoyant force acting on the carriage and its chambers. Thus, lateral displacement of the effective center of gravity of the system is minimized as is the work associated with displacing the center of gravity.

When an individual chamber is in deep water in cavity 24, it is relatively far from the center of the system and the amount of weight it applies to the ridge rails 85 is relatively low due to the buoyancy on the individual chamber. The other chamber is in shallow water, relatively close to the canter of the system, and the weight it applies to the ridge rails is high. Thus, ridge rails 85 have a relatively large horizontal extension component as compared to vertical extension component, in order to compensate for the chamber weight differential and keep the system relatively balanced.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A ship lift for lifting and lowering ships between a first waterway and a second waterway comprising:
   a fixed chamber located between a first waterway and a second waterway for a ship to pass through, said fixed chamber having a curved bottom support, said fixed chamber further having a first port and a second port leading respectively to said first waterway and said second waterway for a ship to pass through into and out of said fixed chamber; and,
   a movable chamber positioned within said fixed chamber atop said curved bottom support and sized to hold a ship, said movable chamber movable laterally on said curved bottom support being supported thereon within said fixed chamber and alignable with said first port for a ship to move through into and out of said movable chamber and also alignable with said second port for a ship to move through into and out of said movable chamber.

2. The ship lift of claim 1 and further comprising:
   a mover connected to said movable chamber to laterally move and align said movable chamber supported on said curved bottom support with said first port and also with said second port.

3. The ship lift of claim 2 wherein:
said movable chamber includes a first holding chamber and a second holding chamber connected together with said first holding chamber and said second holding chamber each having a longitudinal axis extending in the same general direction, said first holding chamber and said second holding chamber respectively sized to hold a first ship and a second ship, said first holding chamber acting as a counterweight for said second holding chamber and said second holding chamber acting as a counterweight for said first holding chamber of said ship lift device.

4. The ship lift of claim 3 wherein:
said curved bottom support is convex as viewed from atop said fixed chamber and has a first deep water area, a second deep water, and a shallow water area located between said first deep water area and said second deep water area;
said fixed chamber has a third port leading to said first waterway for a ship to pass through into and out of said movable chamber; said first port and said third port are located respectively at said first deep water area and said second deep water area and are outwardly of said second port located at said shallow water area.

5. The ship lift of claim 4 wherein:
said movable chamber is slidably mounted on said curved bottom support and sized to hold said first ship and said second ship respectively simultaneously in said first holding chamber and said second chamber, and said movable chamber movable laterally to a first position within said fixed chamber simultaneously aligning said first holding chamber with said first port and said second holding chamber with said second port and movable laterally to a second position within said fixed chamber to align said first holding chamber with said second port and said second holding chamber with said third port.

6. The ship lift of claim 5 wherein:
said second port is located between said first port and said third port allowing said first ship to move through said first port into said first holding chamber and said second ship to move through said second port into said second holding chamber while said movable chamber is located in said first position with said mover laterally moving said movable chamber to said second position allowing said first ship to exit said first holding chamber via said second port and said second ship to exit said second holding chamber via said third port.

7. The ship lift of claim 3 wherein:
said curved bottom support is convex as viewed from atop said fixed chamber and has a first deep water area, a second deep water, and a shallow water area located between said first deep water area and said second deep water area;
said fixed chamber has a third port and a fourth port leading respectively to said first waterway and said second waterway for a ship to pass through into and out of said movable chamber; said first port and said third port are located respectively at said first deep water area and said second deep water area and are outwardly of said second port and said fourth port that are located at said shallow water area.

8. The ship lift of claim 7 wherein:
said movable chamber is slidably mounted on said curved bottom support and sized to hold said first ship and said second ship respectively simultaneously in said first holding chamber and said second chamber, and said movable chamber movable laterally to a first position within said fixed chamber simultaneously aligning said first holding chamber with said first port and said second holding chamber with said second port and movable laterally to a second position within said fixed chamber to align said first holding chamber with said fourth port and said second holding chamber with said third port.

9. The ship lift of claim 8 wherein:
said fourth port is located between said first port and said second port, said second port is located between said fourth port and said third port allowing said first ship to move through said first port into said first holding chamber and said second ship to move through said second port into said second holding chamber while said movable chamber is located in said first position with said mover laterally moving said movable chamber to said second position allowing said first ship to exit said first holding chamber via said fourth port and said second ship to exit said second holding chamber via said third port.

10. The ship lift of claim 2 wherein:
said movable chamber includes a main frame connecting together and supporting a first holding chamber and a second holding chamber with said first holding chamber and said second holding chamber each having a longitudinal axis extending in the same general direction, said first holding chamber and said second holding chamber respectively sized to hold a first ship and a second ship, said main frame includes a bottom and said fixed chamber has a supporting floor; and further comprising:
bearings positioned between said bottom of said movable chamber frame and said support floor of said fixed chamber bearingly supporting said movable chamber atop said floor as said mover laterally moves said movable chamber relative to said fixed chamber.

11. A ship lift for lifting and lowering a first ship and a second ship between a first waterway and a second waterway comprising:
a water basin built into ground and located between a first waterway and a second waterway for a first ship and a second ship to pass through in opposite directions, said basin having a curved bottom, said basin further having a first port and a third port leading to said first waterway and a second port leading to said second waterway for said first ship and said second ship to pass through into and out of said basin; and,
a carriage positioned within said basin atop said curved support bottom and having a first holding chamber and a second holding chamber sized to hold said first ship and said second ship, said carriage movable laterally within said basin to a first position whereat said first holding chamber is aligned with said first port for said first ship to move from a first waterway through said first port and into said first holding chamber and said second holding chamber is aligned with said second port for said second ship to move from a second waterway through said second port and into said second holding chamber, said carriage is movable to a second position whereat said first holding chamber is aligned with said second port for said first ship to move from said first holding chamber exiting through said second port to said second waterway and said second holding chamber is aligned with said third port for said second ship to move from said second holding chamber exiting through said third port to said first waterway.

12. The ship lift of claim 11 and further comprising:
a mover connected to said carriage to laterally move said carriage to said first position and to said second position.

13. The ship lift of claim 12 wherein:
said curved bottom is convex as viewed from atop said basin and has a first deep water area, a second deep water area, and a shallow water area located between said first deep water area and said second deep water area;
said first port and said third port are located respectively at said first deep water area and second deep water area and are outwardly of said second port that is located at said shallow water area.

14. A ship lift for lifting and lowering a first ship and a second ship between a first waterway and a second waterway comprising:
a water basin built into ground and located between a first waterway and a second waterway for a first ship and a second ship to pass through in opposite directions, said basin having a curved bottom, said basin further having a first port and a third port leading to said first waterway and a second port and a fourth port leading to said second waterway for said first ship and said second ship to pass through into and out of said basin; and,
a carriage positioned within said basin atop said curved support bottom and having a first holding chamber and a second holding chamber sized to hold said first ship and said second ship, said carriage movable laterally within said basin to a first position whereat said first holding chamber is aligned with said first port for said first ship to move from a first waterway through said first port and into said first holding chamber and said second holding chamber is aligned with said second port for said second ship to move from a second waterway through said second port and into said second holding chamber, said carriage is movable to a second position whereat said first holding chamber is aligned with said fourth port for said first ship to move from said first holding chamber exiting through said fourth port to said second waterway and said second holding chamber is aligned with said third port for said second ship to move from said second holding chamber exiting through said third port to said first waterway.

15. The ship lift of claim 14 and further comprising:
a mover connected to said carriage to laterally move said carriage to said first position and to said second position.

16. The ship lift of claim 15 wherein:
said curved bottom is convex as viewed from atop said basin and has a first deep water area, a second deep water area, and a shallow water area located between said first deep water area and said second deep water area;
said first port and said third port are located respectively at said first deep water area and second deep water area and are outwardly of said second port and said fourth port that are located at said shallow water area.

17. A method of lifting a first ship and a second ship between a first waterway and a second waterway comprising the steps of:
providing a water basin built in ground with a convex upwardly facing bottom, said basin having a first port and a third port leading to a first waterway and a second port leading to a second waterway;
providing a movable carriage with a first holding chamber and a second holding chamber;
positioning said movable carriage within said basin;
laterally moving said carriage to align said first holding chamber with said first port and said second holding chamber with said second port;
moving a first ship in said first waterway through said first port into said first holding chamber;
moving a second ship in said second waterway through said second port into said second holding chamber;
laterally moving said carriage until said first holding chamber is aligned with said second port and said second holding chamber is aligned with said third port;
moving said first ship out of said first holding chamber via said second port to said second waterway; and,
moving said second ship out of said second holding chamber via said third port to said first waterway.

18. The method of claim 17 and further comprising the step of:
providing deep water areas within said basin at said first port and at said third port and a shallow water area within said basin at said second port.

19. The method of claim 18 and further comprising the steps of:
sealing said first holding chamber and said second holding chamber holding water therein; and,
bearingly supporting said movable carriage atop said basin.

20. A method of lifting a first ship and a second ship between a first waterway and a second waterway comprising the steps of:
providing a water basin built in ground with a convex upwardly facing bottom, said basin having a first port and a third port leading to a first waterway and a second port and fourth port leading to a second waterway;
providing a movable carriage with a first holding chamber and a second holding chamber;
positioning said movable carriage within said basin;
laterally moving said carriage to align said first holding chamber with said first port and said second holding chamber with said second port;
moving a first ship in said first waterway through said first port into said first holding chamber;
moving a second ship in said second waterway through said second port into said second holding chamber;
laterally moving said carriage until said first holding chamber is aligned with said fourth port and said second holding chamber is aligned with said third port;
moving said first ship out of said first holding chamber via said fourth port to said second waterway; and,
moving said second ship out of said second holding chamber via said third port to said first waterway.

21. The method of claim 20 and further comprising the step of:
providing deep water areas within said basin at said first port and at said third port and shallow water areas within said basin at said second port and said fourth port.

22. The method of claim 21 and further comprising the steps of:
sealing said first holding chamber and said second holding chamber holding water therein; and,
bearingly supporting said movable carriage atop said basin.

23. The method of claim 20 and further comprising the steps of:

supporting said movable carriage on said convex upwardly facing bottom; and laterally moving said carriage while said carriage is supported on said convex upwardly facing bottom.

24. The method of claim 17 and further comprising the steps of:

supporting said movable carriage on said convex upwardly facing bottom; and laterally moving said carriage while said carriage is supported on said convex upwardly facing bottom.

* * * * *